(12) United States Patent
Grave et al.

(10) Patent No.: US 8,941,311 B2
(45) Date of Patent: Jan. 27, 2015

(54) CONTROL OF THE INTENSITY OF A LED LIGHTING SYSTEM

(71) Applicant: Bombardier Transportation GmbH, Berlin (DE)

(72) Inventors: Jean-Pierre Magalhaes Grave, Brossard (CA); Carl Lavertu, Beloeil (CA); Daniel Lee, Mercier (CA)

(73) Assignee: Bombardier Transportation GmbH, Berlin (DE)

( * ) Notice: Subject to any disclaimer, the term of this patent is extended or adjusted under 35 U.S.C. 154(b) by 83 days.

(21) Appl. No.: 13/859,350

(22) Filed: Apr. 9, 2013

(65) Prior Publication Data

US 2014/0300282 A1    Oct. 9, 2014

(51) Int. Cl.
*H05B 33/08*      (2006.01)

(52) U.S. Cl.
CPC .................................. *H05B 33/0845* (2013.01)
USPC ........... 315/185 R; 315/77; 315/294; 315/160

(58) Field of Classification Search
USPC ................ 315/77, 185 R, 160, 161, 294, 307
See application file for complete search history.

(56) References Cited

U.S. PATENT DOCUMENTS

| | | | |
|---|---|---|---|
| 6,030,241 A | 2/2000 | Chiba | |
| 6,416,340 B2 | 7/2002 | Schaefer et al. | |
| 6,540,373 B2 | 4/2003 | Bailey | |
| 6,659,623 B2 | 12/2003 | Friend | |
| 6,692,316 B2 | 2/2004 | Hsieh et al. | |
| 6,880,952 B2 | 4/2005 | Kiraly et al. | |
| 7,057,351 B2 * | 6/2006 | Kuo ................................ | 315/86 |
| 7,789,529 B2 | 9/2010 | Roberts et al. | |
| 8,132,935 B2 | 3/2012 | Park et al. | |
| 8,210,715 B2 | 7/2012 | Mostoller et al. | |
| 2007/0291473 A1 | 12/2007 | Traynor | |
| 2008/0074280 A1 | 3/2008 | Batchelor et al. | |
| 2010/0295482 A1 | 11/2010 | Chemel et al. | |
| 2011/0001438 A1 | 1/2011 | Chemel et al. | |
| 2011/0109235 A1 | 5/2011 | Link | |
| 2011/0133655 A1 | 6/2011 | Recker et al. | |
| 2011/0140609 A1 | 6/2011 | Ku et al. | |
| 2011/0309746 A1 * | 12/2011 | Eckel et al. ..................... | 315/77 |
| 2012/0153828 A1 | 6/2012 | Gordin | |
| 2013/0063027 A1 * | 3/2013 | Recker et al. ................... | 315/86 |
| 2013/0147269 A1 | 6/2013 | Zimmermann et al. | |
| 2013/0147397 A1 * | 6/2013 | McBryde et al. ............. | 315/312 |
| 2013/0200707 A1 | 8/2013 | Hartmann et al. | |
| 2014/0132164 A1 * | 5/2014 | McBryde et al. ............. | 315/187 |

FOREIGN PATENT DOCUMENTS

| | | |
|---|---|---|
| GB | 2472294 A | 2/2011 |
| WO | 2009011898 A2 | 1/2009 |

(Continued)

*Primary Examiner* — Don Le
(74) *Attorney, Agent, or Firm* — The Webb Law Firm

(57) ABSTRACT

There is described a system and method for controlling the intensity of a lighting system for vehicles comprising light emitting diodes mounted on printed circuit boards (PCBs). The method comprises sending a first modulation signal to the lighting modules from a master controller upon detection of a presence of power from a power source by the master controller; and sending a second modulation signal to the lighting modules from the master controller upon detection of an absence of power from a power source by the master controller. The first modulation signal corresponds to a first LED intensity and the second modulation signal corresponds to a second LED intensity lower than the first light intensity.

19 Claims, 17 Drawing Sheets

GENERAL ARCHITECTURE

(56) References Cited

FOREIGN PATENT DOCUMENTS

| WO | 2011124721 | A1 | 10/2011 |
| WO | 2011124723 | A1 | 10/2011 |
| WO | 2012006709 | A1 | 1/2012 |
| WO | 2012029053 | A1 | 3/2012 |

\* cited by examiner

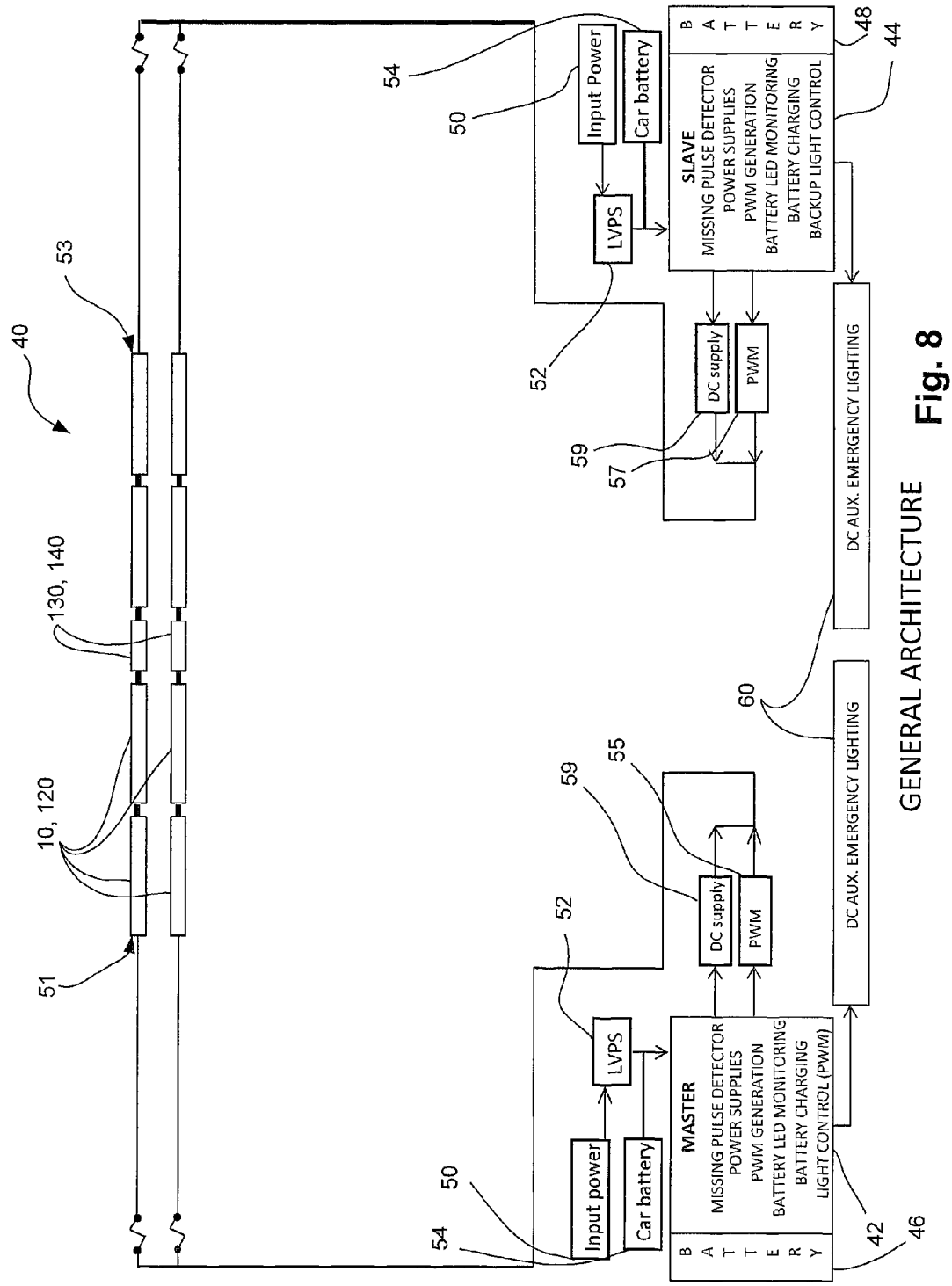
GENERAL ARCHITECTURE    Fig. 8

NORMAL OPERATION MODE

CONTROL OF THE INTENSITY OF A LED LIGHTING SYSTEM

BACKGROUND (a) Field

The subject matter disclosed generally relates to lighting systems. More particularly, the subject matter relates to lighting modules for installation in an end-to-end configuration.

(b) Related Prior Art

Railway vehicles, or trains, consist of a series of connected vehicles for rail transport that move along a track to transport cargo or passengers from one place to another. Many modern trains are powered by electricity supplied by overhead electrical wires or additional electrified rails. Other sources of power (such as diesel engines, batteries and gas turbines) may be possible.

Rail car design and the general safety of passenger trains have evolved over time, making travel by train remarkably safe. One safety feature is to provide an appropriate lighting system. As shown in FIG. 1, typical main interior lighting systems 100 for railway vehicles, or trains, include, but are not limited to, a power supply (AC or DC supply) 102, a plurality of fluorescent light fixtures 104 typically mounted on the ceilings, the floors and/or the walls of the train via ballasts 106. Moreover, lighting systems for railway vehicles may also include a plurality of disaster light fixtures 108, also mounted on the ceilings, the floors and/or the walls and controlled by another power source control 110 using a dedicated battery 112 charged via a battery charger 114. In these configurations, fixtures and circuitry are independent from the main lighting system. Lighting systems exist where the emergency battery is connected to some of the main lighting fixtures and not to independent emergency lighting fixtures.

Unfortunately, such a configuration including a plurality of fluorescent light fixtures 104 may result in an important amount of wiring in the ceiling and in a ceiling construction that is harder to achieve. Moreover, such a configuration including a plurality of fluorescent light fixtures 104 requires an important number of standard enclosures for the plurality of fluorescent light fixtures 104 in the ceilings, floors and/or walls. Also, when one of the fluorescent light fixtures 104 becomes inoperative, it might be hard to replace the fluorescent light fixture 104 without affecting the whole lighting system 100. Additionally, this configuration requires other auxiliary components, a speaker module or a video module for example, to be installed independently from the lighting system 100 with dedicated harnesses and enclosures. In an embodiment, the speaker module comprises a speaker and the video module comprises a video display and/or a video camera. This may again result in an important amount of wiring in the ceilings and walls of the railway vehicle or train. Also, emergency lighting needs to be installed as individual components when this configuration is used in a railway vehicle.

There is therefore a need for improvements in lighting systems for railway vehicles.

SUMMARY

There is described herein a lighting system for vehicles comprising light emitting diodes mounted on printed circuit boards (PCBs). Auxiliary components such as speakers are mounted on some of the PCB lighting modules which are connected in an end-to-end relationship and which form light rows of the lighting system. Electrical traces for the auxiliary components form part of the PCBs. Connectors at each end of a PCB are compatible with the connectors on a neighboring PCB and are optionally connectable with a respective corresponding connector assembly of another lighting module in a direction substantially normal to the planar mounting surface of the PCB or in a direction substantially parallel to the planar mounting surface.

The lighting module and lighting system described herein provide a substantial reduction in or elimination of wiring in the ceiling and simplifies ceiling construction by eliminating typical enclosures of light fixtures. Also, it provides a seamless integration of the lighting modules and the lighting system to the ceiling structure. Additionally, this configuration allows an integration of the emergency functions required for railway applications. Furthermore, the lighting module and lighting system require less time and allow easier replacement of failed light emission diodes (LEDs) or failed lighting modules. Also, it provides the elimination of distinct audio distribution (or other auxiliary electrical component) wiring in the ceiling by integrating this function on the lighting module and/or on the lighting system. It provides also a thinner and lighter overhead lighting module and/or lighting system. It also provides simplified and less expensive overall light and audio systems which are more reliable because of redundancy of power distribution, and which also support light dimming (i.e., light intensity control) and other advanced functions.

According to an embodiment, there is provided a lighting system connected to a power source, the lighting system comprising:

lighting modules connected end-to-end and forming a row having a first line end a second line end, each lighting modules comprising light emitting diodes (LEDS); and a master controller electrically connected to the first line end, the master controller adapted to being powered by the power source, the master controller being operative to control an intensity of the LEDs by sending a first modulation signal and a second modulation signal to the lighting modules, the first modulation signal corresponding to a first LED intensity and the second modulation signal corresponding to a second LED intensity;

wherein the first modulation signal is sent when the master controller detects a presence of the power source and the second modulation signal is sent when the master controller detects an absence of the power source.

According to an aspect, the lighting system further comprises a slave controller electrically connected to the second line end, the slave controller adapted to being powered by the power source.

According to an aspect, the lighting system is further connected to an external rechargeable battery, further wherein the master controller is operative to send a first control signal and a third control signal to the slave controller and wherein the slave controller is operative to send a second control signal and a fourth control signal to the master controller, the master controller being operative to send the first control signal when the master controller detects a presence of power from the power source or from the external rechargeable battery and to send the third control signal when the master controller detects an absence of power from the power source, an absence of power from the external recharge battery and an absence of the second control signal, the slave controller being operative to send the second control signal when the slave controller detects an absence of the first control signal and to send the fourth control signal when the slave controller detects an absence of the first control signal, an absence of power from the power source, an absence of power from the external rechargeable battery and an absence of the third control signal.

According to an aspect, the slave controller is operative to control the intensity of the LEDs by sending the first modulation signal and second modulation signal to the lighting modules; further wherein the first modulation signal is sent when the slave controller detects a presence of the power source and an absence of the first control signal and wherein the second modulation signal is sent when the slave controller detects an absence of the first control signal, an absence of the power source and a presence of the external rechargeable battery.

According to an aspect, the master controller is operative to generate a third modulation signal corresponding to a third LED intensity upon detecting an absence of the power source, an absence of the external rechargeable battery and an absence of the second control signal, and the slave controller is operative to generate the third modulation signal upon detecting an absence of the first control signal, an absence of the power source, an absence of the external rechargeable battery and an absence of the third control signal.

According to an aspect, the lighting system further comprises a first emergency battery and a second emergency battery connected to the LEDs and are operative to power the LEDs when one of the master controller and the slave controller sends the third modulation signal.

According to an aspect, the first emergency battery is located on a first of the lighting modules and the second emergency battery is located on a second of the lighting modules.

According to an aspect, the master controller further comprises the first emergency battery and wherein the slave controller comprises the second emergency battery.

According to an aspect, the master controller comprises a first missing pulse detector operative to detect an absence of the second control signal and the fourth control signal and wherein the slave controller comprises a second missing pulse detector operative to detect an absence of the first control signal and the third control signal.

According to an aspect, the master controller comprises a first modulation device to produce the first modulation signal, the second modulation signal, the third modulation signal, the first control signal and the third control signal, and wherein the slave controller comprises a second modulation device to produce the first modulation signal, the second modulation signal, the third modulation signal, the second control signal and the fourth control signal.

According to an aspect, the third LED intensity is lower than the second LED intensity which is lower than the first LED intensity.

According to another embodiment, there is provided a method for method for controlling an intensity of light emitting diodes (LEDs) installed on a lighting module, the method comprising:

sending a first modulation signal to the lighting module from a master controller upon detection of a presence of power from a power source by the master controller; and sending a second modulation signal to the lighting module from the master controller upon detection of an absence of power from a power source by the master controller;

wherein the first modulation signal corresponds to a first LED intensity and the second modulation signal corresponds to a second LED intensity lower than the first LED intensity.

According to an aspect, the method further comprises sending by the master controller a first control signal to a slave controller upon detection by the master controller of a presence of power from a power source, a presence of the first control signal being indicative of control of the intensity of the LEDs by the master controller.

According to an aspect, the method further comprises sending by the slave controller a second control signal to the master controller and the first modulation signal upon detection of an absence of the first control signal and of the presence of power from a power source by the slave controller, a presence of the second control signal being indicative of control of the intensity of the LEDs by the slave controller.

According to an aspect, the method further comprises sending by the slave controller the second control signal to the master controller and the second modulation signal upon detection by the slave controller of an absence of the first control signal, an absence of power from a power source and a presence of power from an external rechargeable battery, a presence of the second control signal being indicative of control of the intensity of the LEDs by the slave controller According to an aspect, the method further comprises sending by the master controller a third control signal to the slave controller and a third modulation signal upon detection of an absence of power from the power source, an absence of power from an external rechargeable battery and an absence of the second control signal, the third modulation signal corresponds to a third LED intensity and a presence of the third control signal being indicative of control of the intensity of the LEDs by the master controller.

According to an aspect, the method further comprises sending by the slave controller a fourth control signal to the master controller and the third modulation signal upon detection of an absence of power from the power source, an absence of power from the external rechargeable battery and an absence of the third control signal, a presence of the fourth control signal being indicative of control of the intensity of the LEDs by the slave controller.

According to an aspect, the first, second, third, and fourth control signals each have a respective frequency, wherein the frequency of the first control signal is greater than the frequency of the second control signal which in turn is greater than the frequency of the third control signal which in turn is greater than the frequency of the fourth control signal.

According to an aspect, the third LED intensity is lower than the second LED intensity which is lower than the first LED intensity.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIG. 8 is a schematic diagram showing a general architecture of a lighting system for a railway vehicle in accordance with another embodiment;

It will be noted that throughout the appended drawings, like features are identified by like reference numerals.

DETAILED DESCRIPTION

In embodiments described herein there are disclosed a lighting module and a lighting system for a railway vehicle.

Figure 1:
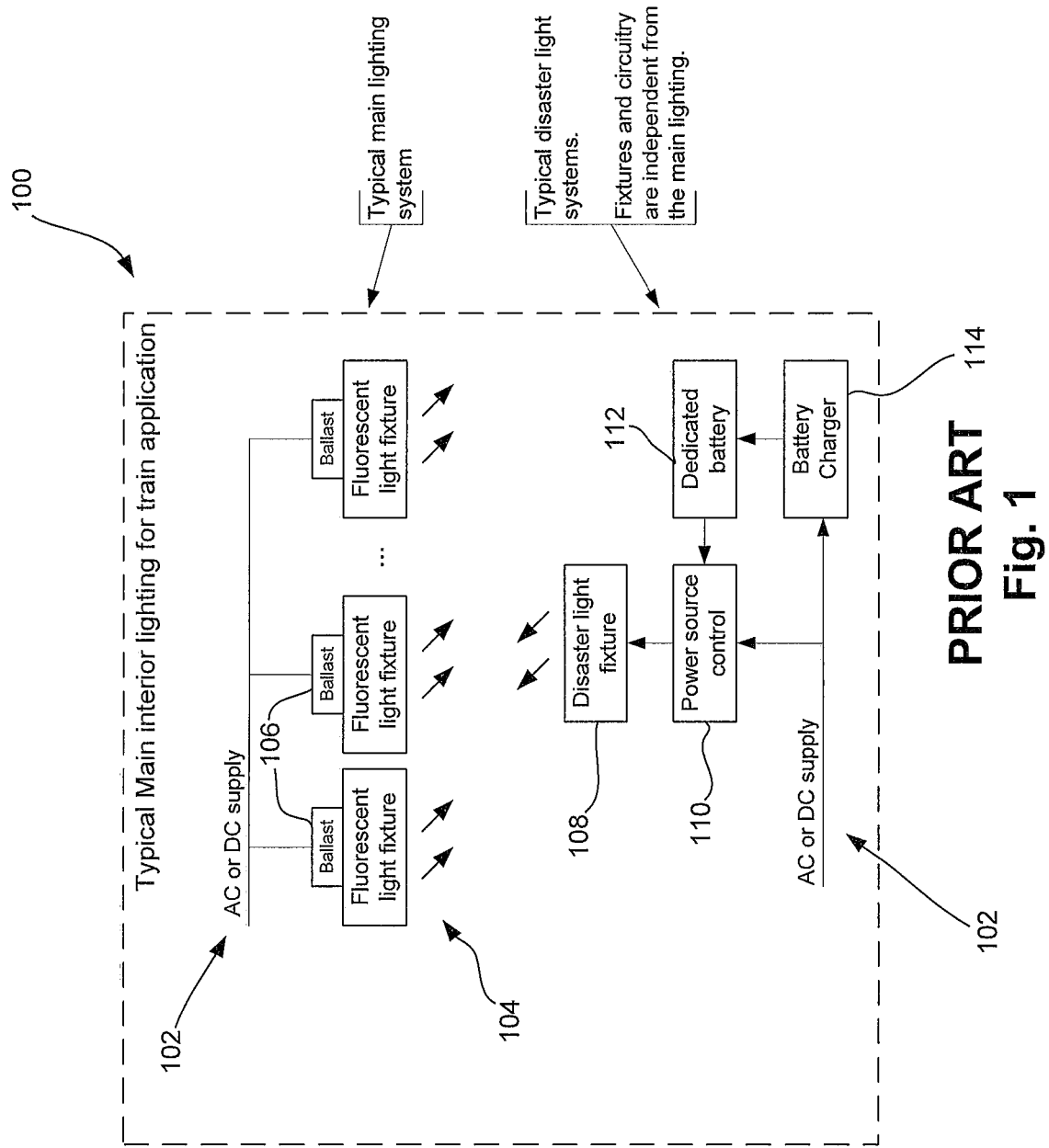
FIG. 1 is a block diagram showing a lighting system for a railway vehicle in accordance with the prior art.
Figure 2:
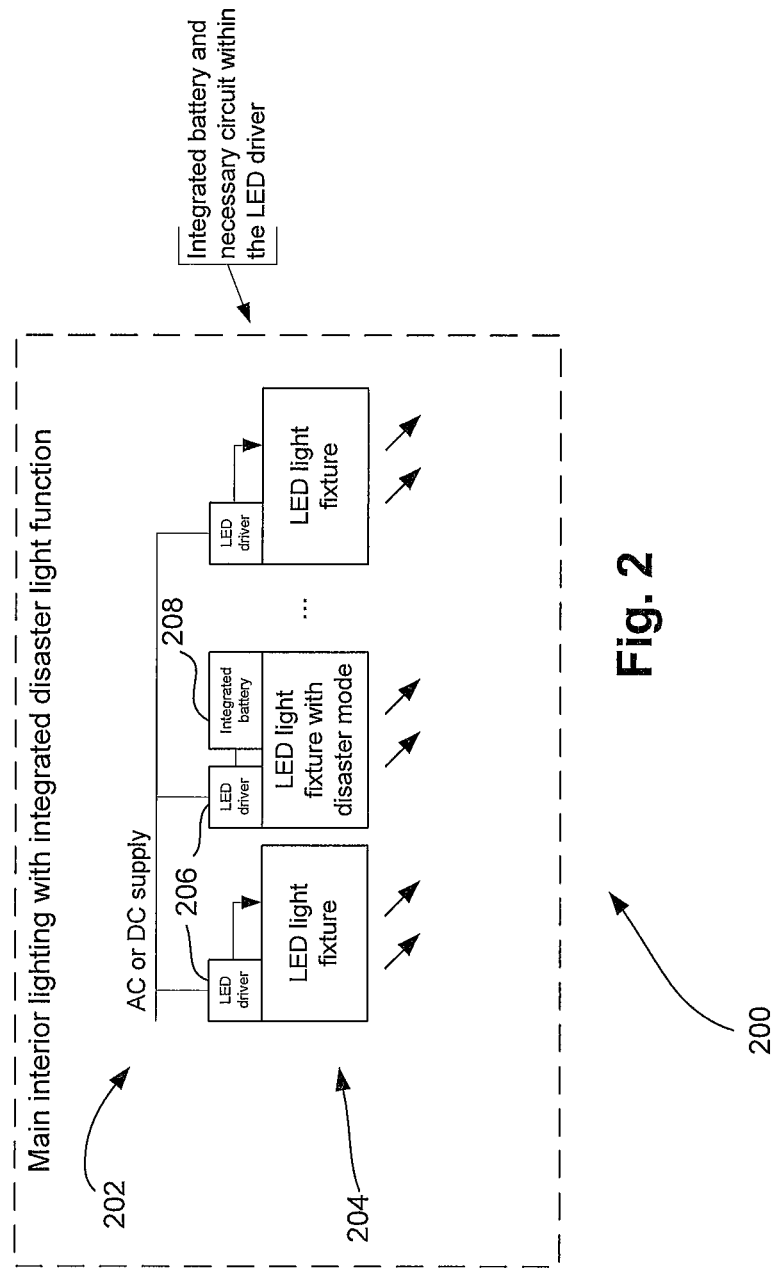
FIG. 2 is a block diagram showing a lighting system for a railway vehicle in accordance with an embodiment.
Figure 3:
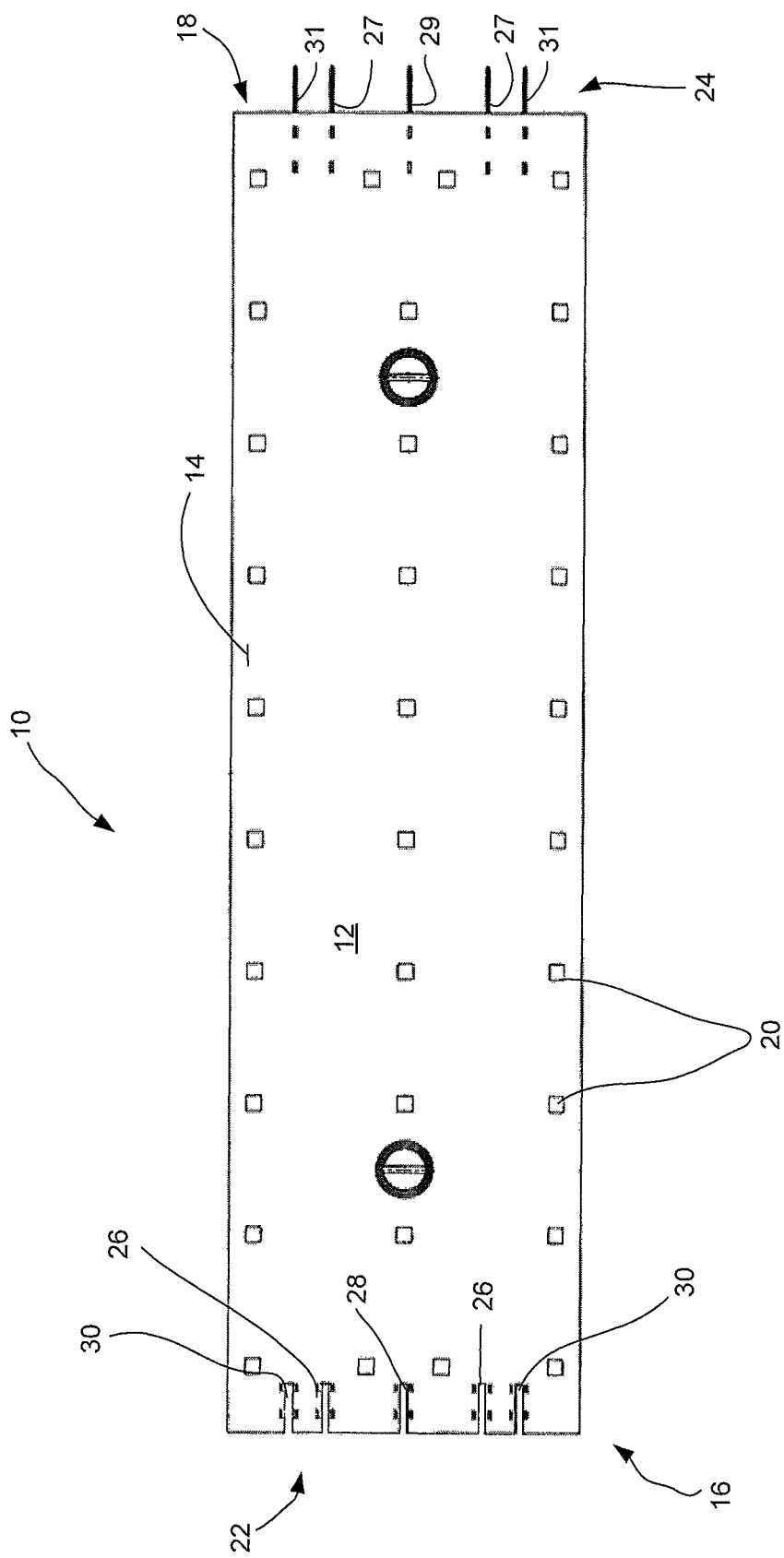
FIG. 3 is a top plan view of a lighting module for a railway vehicle in accordance with another embodiment.
Figure 4:
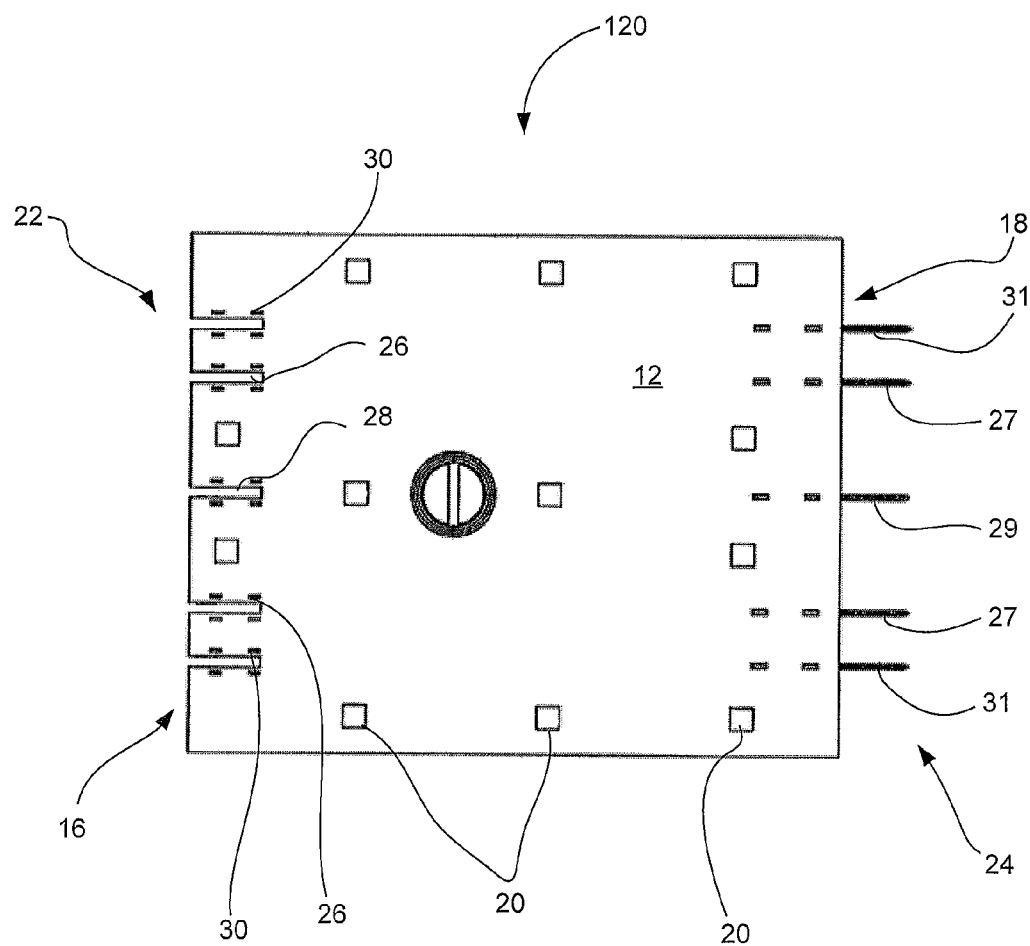
FIG. 4 is a top plan view of a lighting module for a railway vehicle in accordance with another embodiment where the lighting module of FIG. 4 is shorter than the lighting module of FIG. 3.
Figure 5:
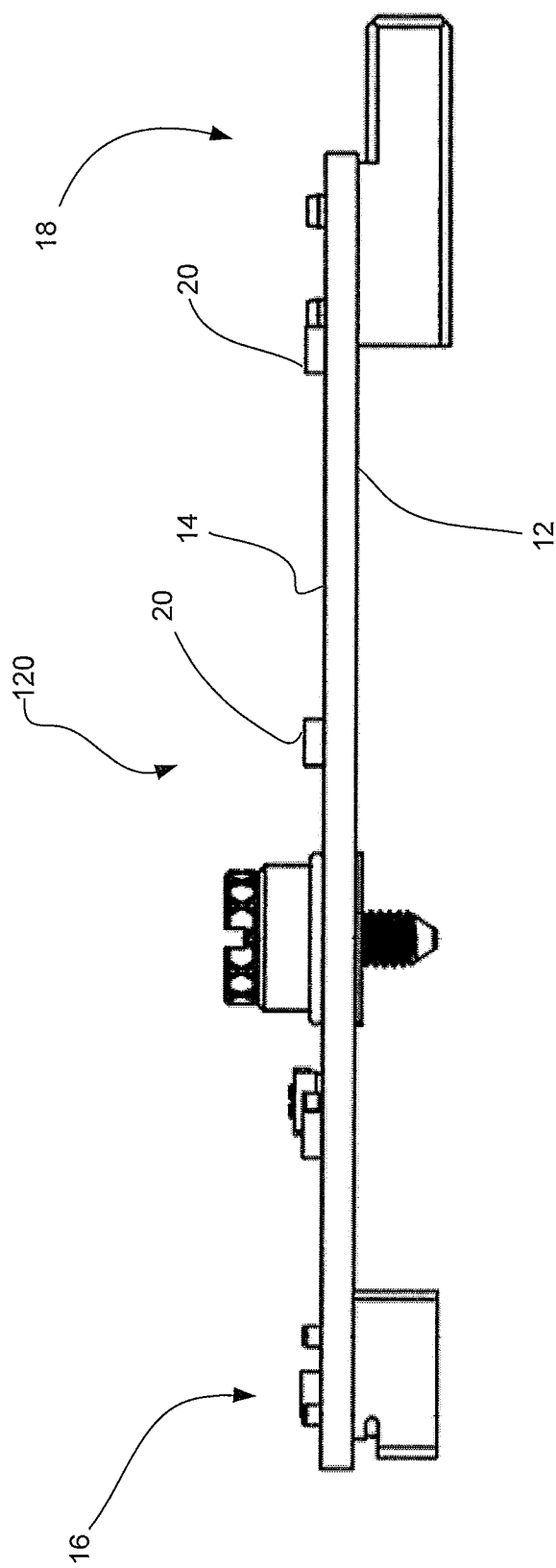
FIG. 5 is a side elevation view of the lighting module for a railway vehicle of FIG. 4.
Figure 6:
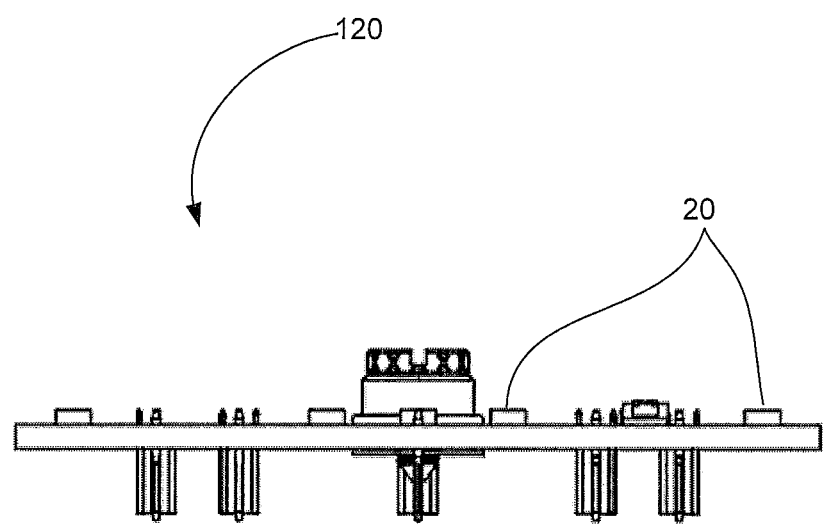
FIG. 6 is a end elevation view of the lighting module for a railway vehicle of FIG. 4.

Referring now to the drawings, and more particularly to FIG. 2, there is shown a lighting system 200 for an enclosure/cabin of railway vehicles, road vehicles, planes or other applications that are deemed appropriate to those skilled in the art. The lighting system 200 comprises a power supply (AC or DC supply) 202, lighting modules 204 mounted on the ceilings, the floors and/or the walls of the enclosure and electrically connected to the power supply 202 via LED drivers. Some lighting modules 204 may also include an integrated rechargeable battery 208. Various embodiments of the lighting modules 204 are further detailed below.

Now referring to FIGS. 3, 4, 5, 6, 7a, 7b, 15 and 16 there are shown various embodiments of a lighting module as well as embodiments for an auxiliary electrical module. In the Figures, the various embodiments of the lighting modules and the auxiliary modules will bear different numbers while the individual components will keep their numbers if they represent the same embodiment of the component. The principal difference between a lighting module and an auxiliary module is the presence or absence of LEDs and of auxiliary electrical components. The physical dimensions of a lighting module and an auxiliary module may also differ. However, the connectors at the end of either type of module must match in order to assure electrical connection in an end-to-end relationship.

In FIGS. 3, 4, 5, 6, 7a, 7b, 15 and 16, the lighting module 10, 120 and auxiliary electrical module 130, 140 include a printed circuit board 12 (PCB). The lighting module 10, 120 and auxiliary electrical module 130, 140 define a planar mounting surface 14, a first end 16 and a second end 18. The lighting module 10, 120 also includes a plurality of light emitting diodes (or LEDs) 20 located on the PCB 12. More specifically, the LEDs 20 are located on the planar mounting surface 14.

The auxiliary electrical module 130, 140 include an auxiliary electrical component 33, such as a speaker module or a video module. Optionally, the auxiliary electrical module 130, 140 may also include a plurality of LEDs 20 located on PCB 12.

The lighting module 10, 120 and auxiliary electrical module 130, 140 also comprises a first connector assembly 22 located proximate the first end 16. The lighting module 10, 120 and auxiliary electrical module 130, 140 also comprises a second connector assembly 24 located proximate the second end 18. The first connector assembly 22 and the second connector assembly 24 are compatible with each other thereby permitting connection of lighting modules in an end-to-end relationship.

According to another embodiment, the first connector assembly 22 and the second connector assembly 24 are optionally connectable with a respective corresponding connector assembly of another lighting module in a direction substantially normal to the planar mounting surface 14 or in a direction substantially parallel to the planar mounting surface 14. It is understood that "optionally connectable" in the context of this description means that the installer of the lighting modules can connect/install a lighting module 10, 120 and auxiliary electrical module 130, 140 in a direction substantially normal to the planar mounting surface 14 or in a direction substantially parallel to the planar mounting surface 14 or according to a combination of substantially normal and substantially parallel to the planar mounting surface 14 as he/she sees fit.

Figure 7A:
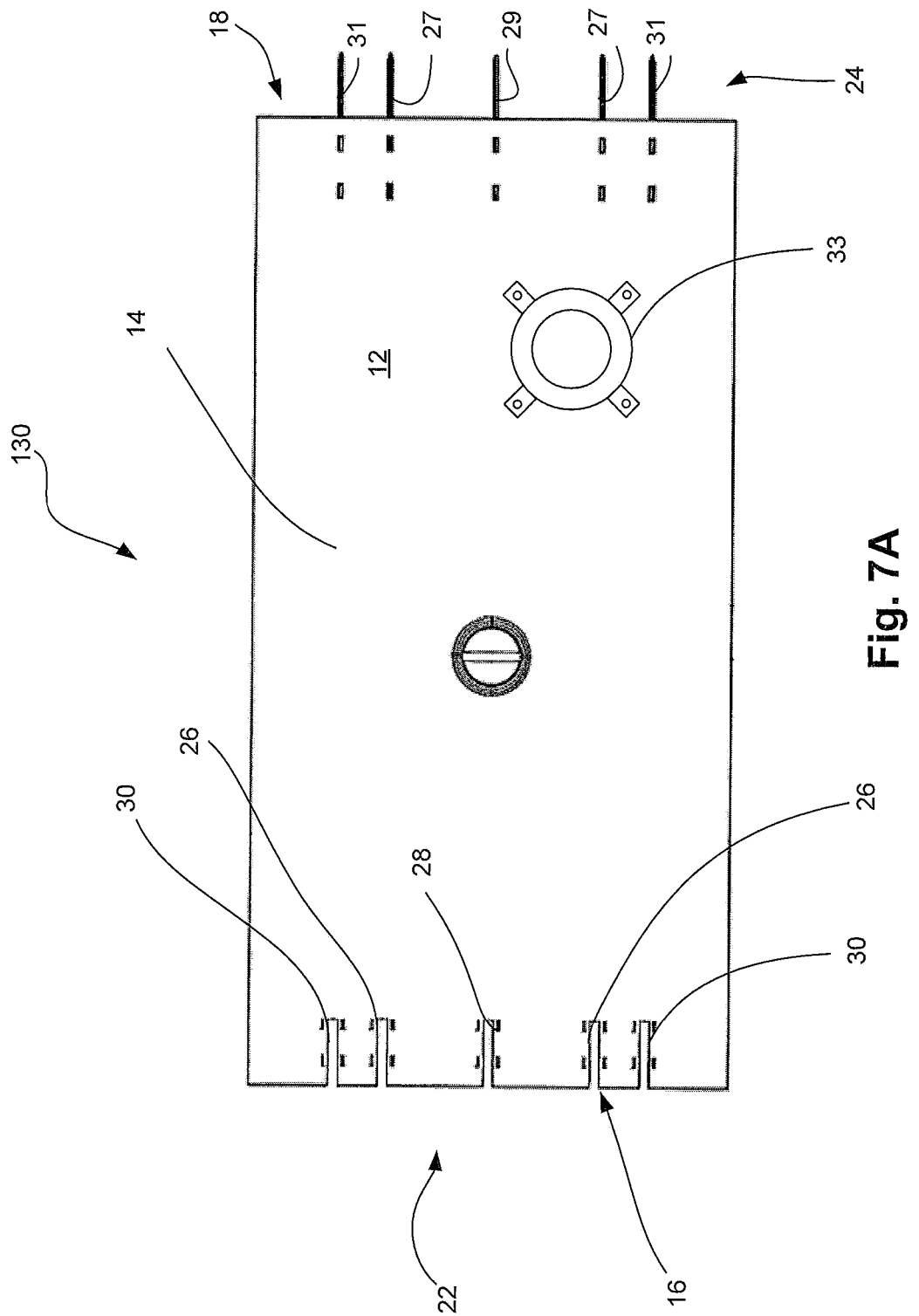
FIG. 7a is a top plan view of an auxiliary electrical module according to an embodiment and wherein the auxiliary electrical module is electrically and mechanically compatible with the lighting modules described herein.
Figure 7B:
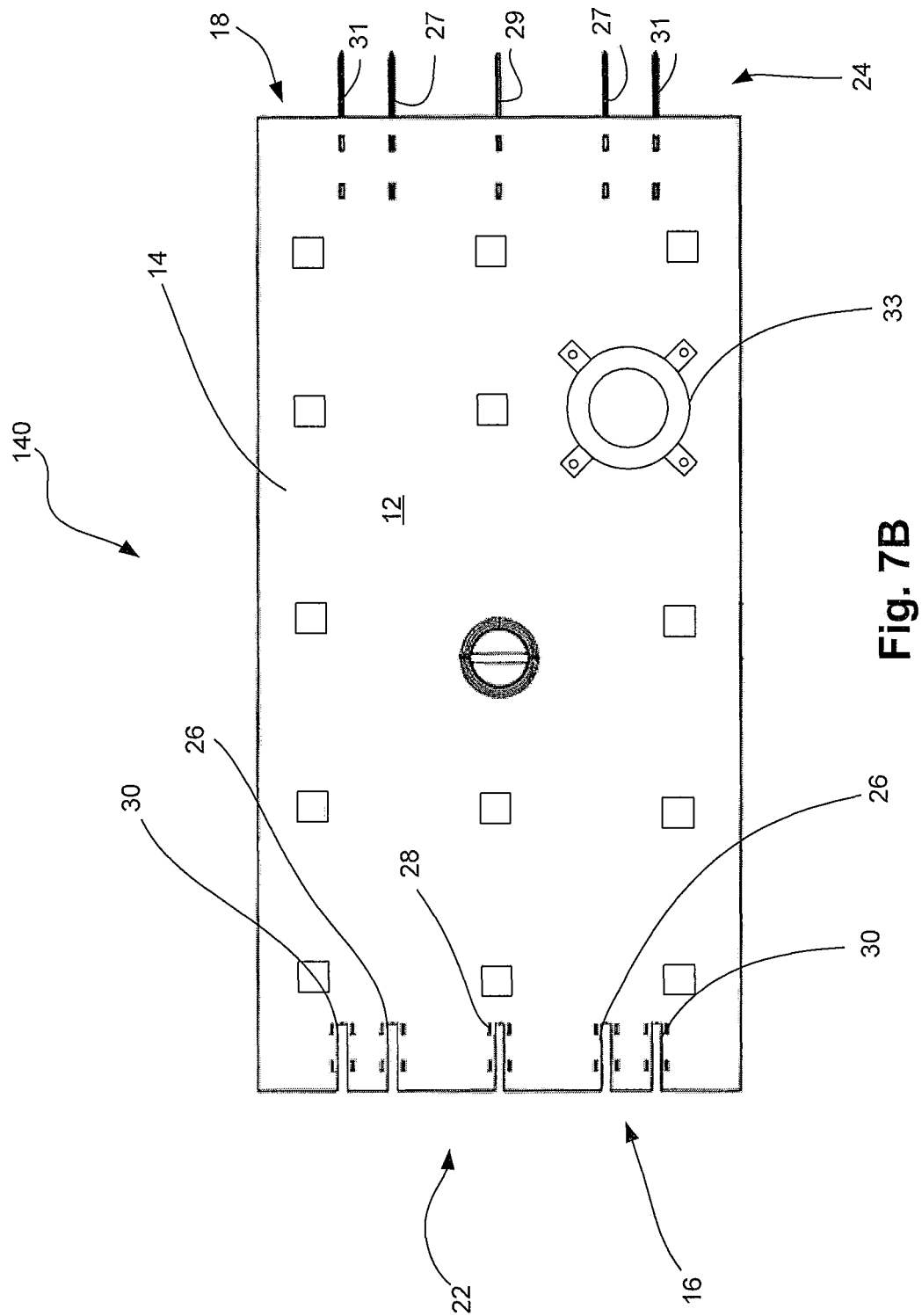
FIG. 7b is a top plan view of a lighting module according to another embodiment and wherein the lighting module comprises LEDs and auxiliary electrical components and is electrically and mechanically compatible with the lighting modules described herein.

According to an embodiment, the first connector assembly 22 comprises a first LED power connector 26 and a first auxiliary power connector 30 and the second connector assembly 24 comprises a second LED power connector 27 and a second auxiliary power connector 31. The first and second LED power connectors 26, 27 are electrically connected to each other and to the LEDs 20, while the first and second auxiliary power connectors 30, 31 are electrically connected to each other distinctly from the first and second LED power connectors 26, 27 and are for providing electrical energy to the auxiliary electrical component 33 (FIGS. 7a and 7b) in the lighting system thereby avoiding additional external electrical connections for the auxiliary electrical component 33 (FIGS. 7a and 7b). The auxiliary electrical component 33 may be directly mounted on the planar mounting surface 14 or may optionally be remotely installed in the vehicle and connected to the first and second auxiliary power connectors 30, 31 through wires or through a connector mounted on the planar mounting surface 14.

According to an embodiment, the first connector assembly 22 comprises a first light modulation connector 28 and the second connector assembly 24 comprises a second light modulation connector 29. The first and second light modulation connectors 28, 29 are connected to each other and are for providing a light modulation signal to control an intensity of the LEDs 20 via the light control circuit 39. The functions associated with the control of the intensity of the LEDs 20 will be discussed further hereinbelow.

Figure 15:
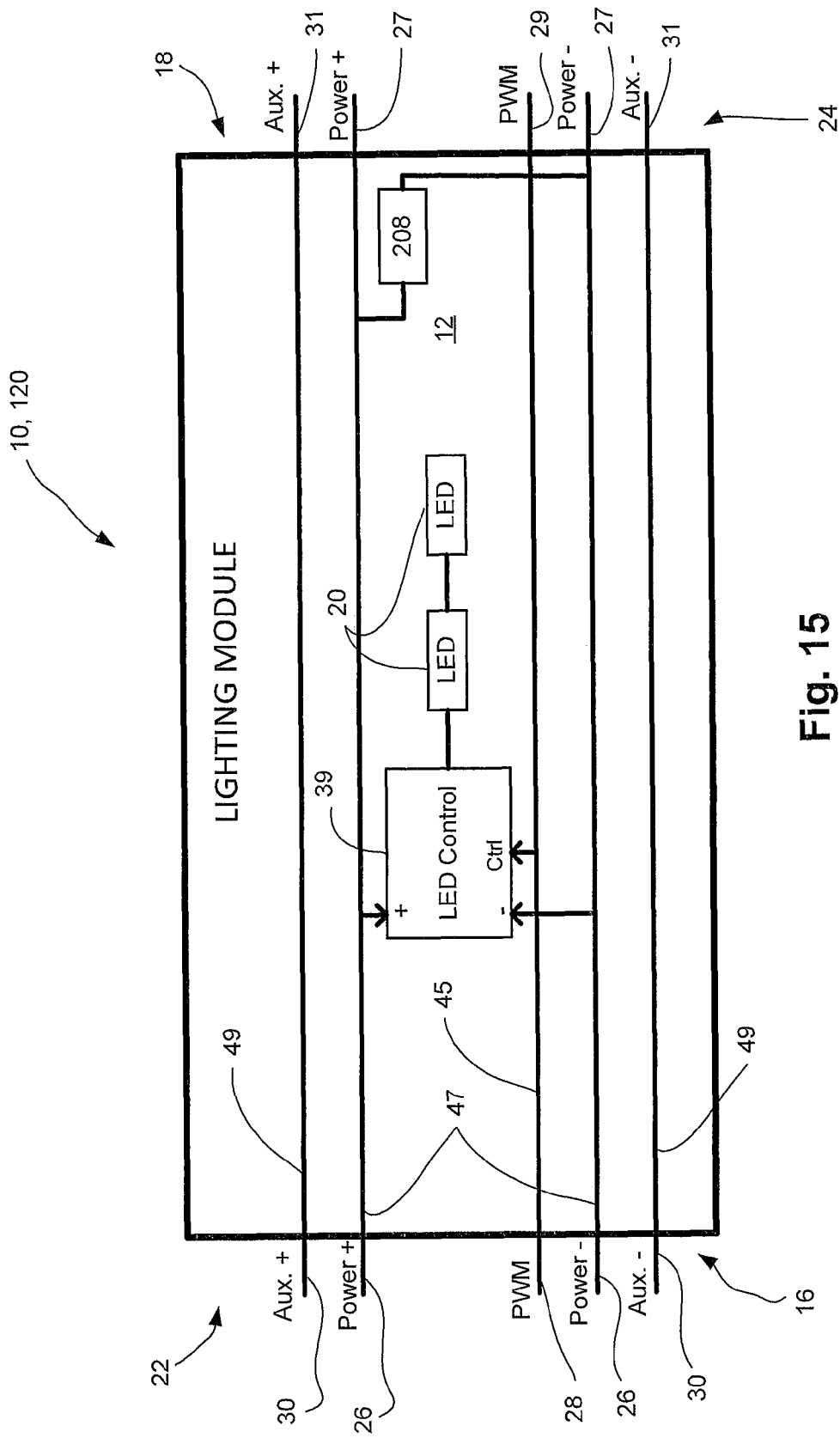
FIG. 15 is a schematic diagram showing a lighting module according to an embodiment.
Figure 16:
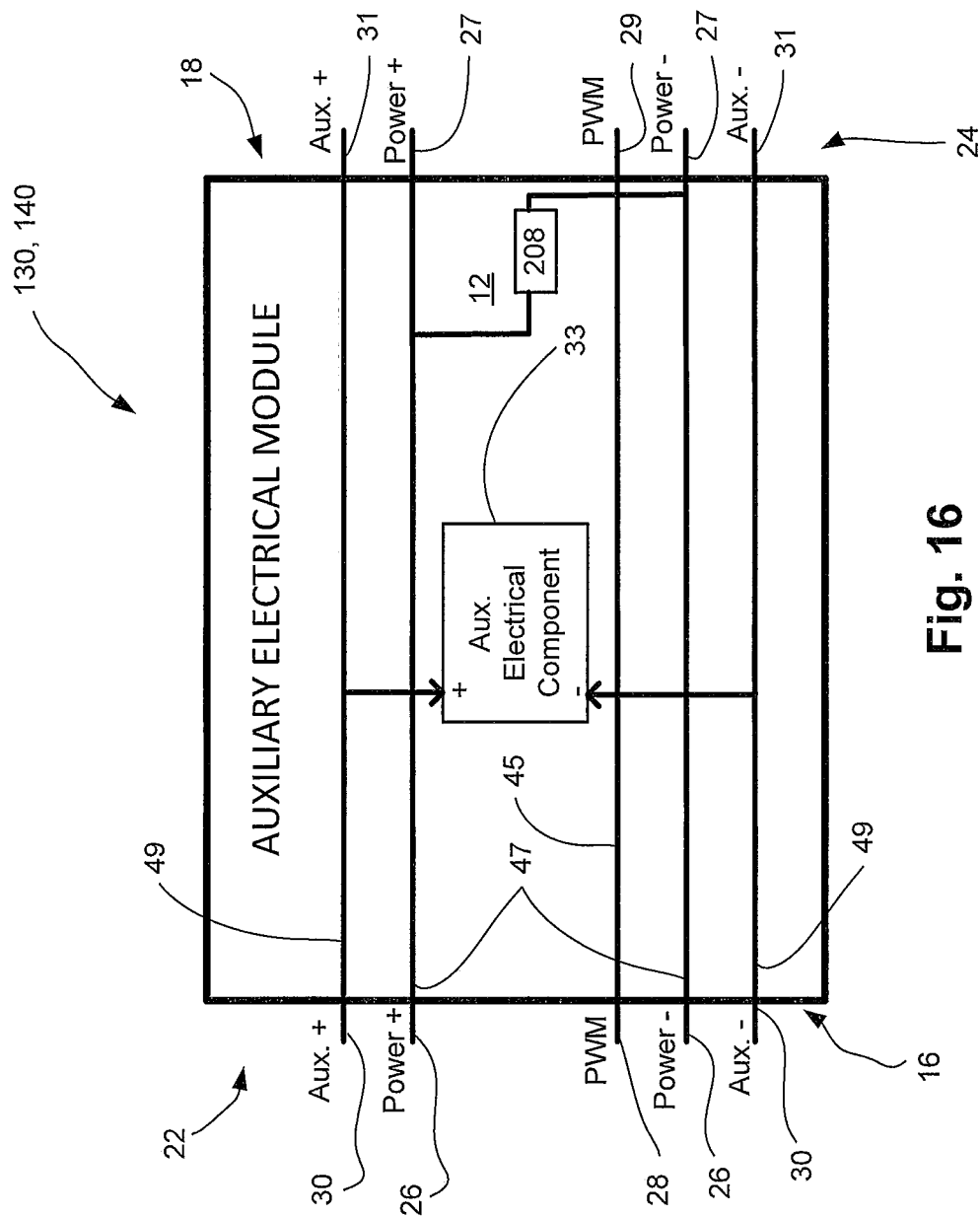
FIG. 16 is a schematic diagram showing an auxiliary module according to an embodiment.

FIGS. 15 and 16 are now concurrently referred to. According to an embodiment, the lighting module 10, 120 and auxiliary electrical module 130, 140 further comprise a LED electrical trace 47 on the PCB 12 electrically connecting the first LED power connector 26 and the second LED power connector 27 and for providing electrical energy to the LEDs 20. The embodiments of FIGS. 15 and 16 show more than one LED electrical trace 47, more than one first LED power connector 26 and more than one second LED power connector 27.

According to an embodiment, the lighting module 10, 120 and auxiliary electrical module 130, 140 further comprise an auxiliary electrical trace 49 (FIGS. 15, 16) on the PCB 12 electrically connecting the first auxiliary power connector 30 and the second auxiliary power connector 31. The auxiliary electrical trace 49 is distinct from the LED electrical trace 47 and provides electrical energy to the auxiliary electrical component 33. The embodiments of FIGS. 15 and 16 show more than one auxiliary electrical trace 49, more than one first auxiliary power connector 30 and more than one second auxiliary power connector 31.

The PCB 12 further comprises a PWM electrical trace 45 between the first light modulation connector 28 and the second light modulation connector 29 for carrying the light modulation signal to the LED control 39. In an embodiment, the electrical traces 45, 47, 49 are part of the structure of the PCB 12.

Now referring to FIGS. 8 to 11, there is shown a lighting system 40 for a railway vehicle according to an embodiment. The lighting system 40 comprises lighting modules 10, 120 and auxiliary electrical modules 130, 140 forming a light row having a first light row end 51 and a second light row end 53. Each lighting module 10, 120 and auxiliary electrical module 130, 140 corresponds to the modules described above and will not be further described here. In an embodiment, the lighting modules are disposed to form at least two rows of lighting modules.

Because of the compatibility of the first connector assembly 22 with the second connector assembly 24, the lighting system 40 can incorporate any combination of lighting modules 10, 120 and auxiliary electrical modules 130, 140 connected in an end-to-end relationship to meet the requirements of a particular application. This advantageously allows for the lighting power, the light modulation signal and an auxiliary signal to be carried from one module 10, 120, 130, 140 to an adjacent module 10, 120, 130, 140 irrespective as to whether the LEDs 20 and the auxiliary electrical components 33 are operative or not.

According to another embodiment, the lighting system 40 further includes a master controller 42 and a slave controller 44. The master controller 42 may include a first emergency battery 46 and the slave controller 44 may include a second emergency battery 48. The master controller 42 and the slave controller 44 may be connected to a vehicle power source 52. Either the vehicle power source 52 generates its power via the vehicle itself (for example, using a generator), or is picked up from an electrical grid and supplied by overhead electrical wires or additional electrified rails (i.e., the external power source 50). Typically, emergency batteries 46 and 48 are of the rechargeable type and can be recharged by the vehicle power source 52. Ultimately, the master controller 42 and the slave controller 44 produce a DC power supply illustrated as DC supply 59.

According to an embodiment, the master controller 42 comprises a first modulation device 55 connected to the first light modulation connector 28 of the lighting modules 10, 120 and the auxiliary electrical modules 130, 140 at the first light row end 51. The slave controller 44 comprises a second modulation device 57 connected to the second light modulation connector 29 of the lighting modules 10, 120 and the auxiliary electrical modules 130, 140 at the second light row end 53. The first modulation device 55, or alternatively the second modulation device 57, is for providing a light modulation signal to control an intensity of the LEDs on the lighting module. The first and second modulation devices 55, 57 may be, for example, pulse width modulators.

FIGS. 8 to 14 will now be described. FIG. 8 shows a general architecture of the lighting system 40 for a railway vehicle. According to an embodiment, the available power for the lighting is 850 W. In a typical arrangement, the lighting modules form two rows of lights; a row of lights on the right-hand side of the enclosure (i.e., the train car) and a left-hand side of the enclosure. The rows of lights may be installed on, or form part of, a ceiling surface of the enclosure.

Figure 9:
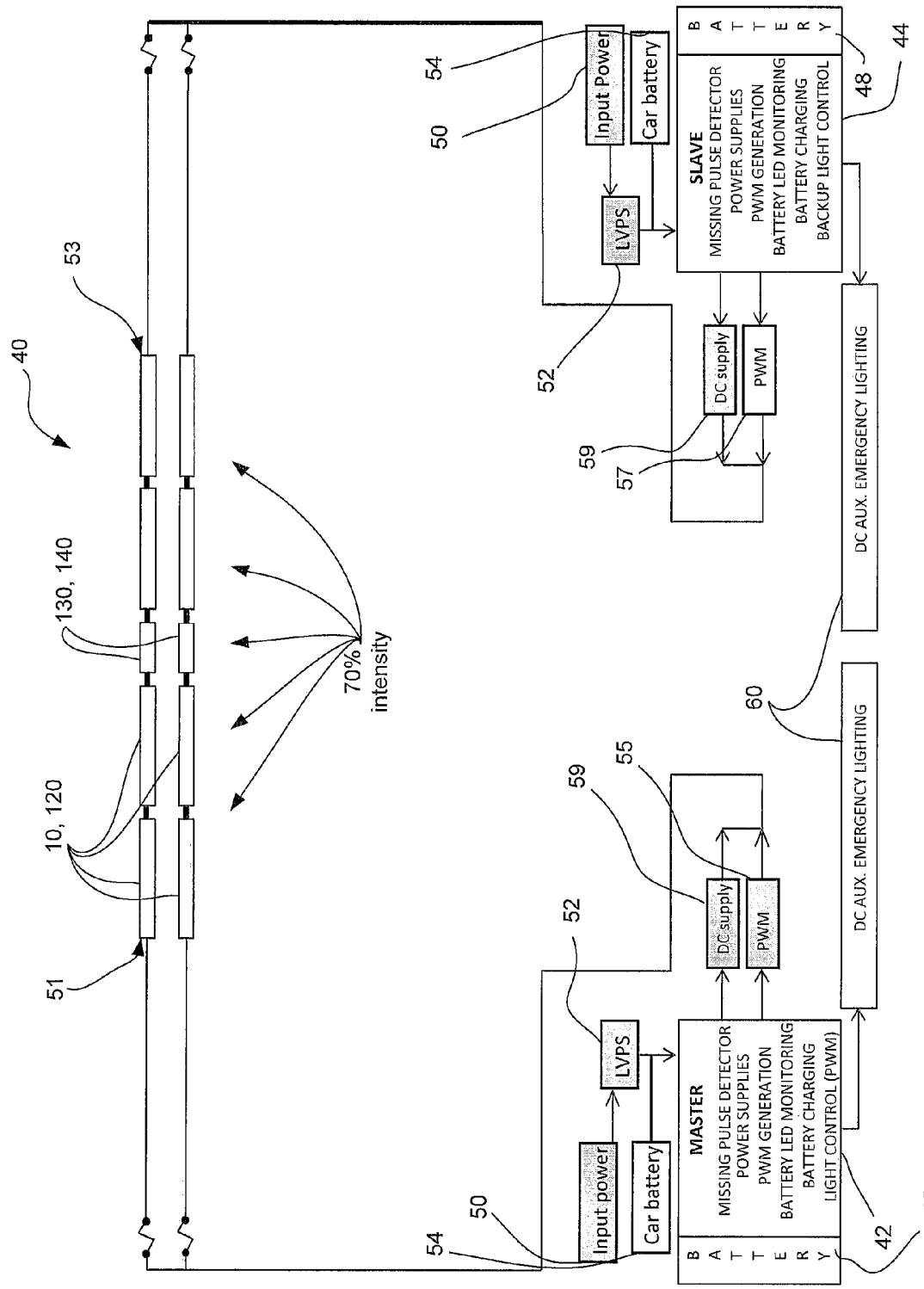
FIG. 9 is a schematic diagram showing a lighting system for a railway vehicle in accordance with another embodiment, where the lighting system is in a normal operation mode.

FIG. 9 shows the lighting system 40 in a normal operation mode. The modules which are in operation are shown in grey. According to the normal operation mode, electrical power is provided to the lighting modules 10, 120 and auxiliary electrical modules 130, 140 by the external power source 50. Electrical power is provided to the lighting modules 10, 120 and auxiliary electrical modules 130, 140 at the first light row end 51 through the master controller 42 and to the lighting modules 10, 120 and auxiliary electrical modules 130, 140 at the second light row end 53 through the slave controller 44. Alternatively, electrical power may be provided by the vehicle power source 52 alone or in combination with the external power source 50. The first modulation circuit (in the master controller 42) controls the duty cycle of the LEDs on the lighting modules 10, 120 and auxiliary electrical modules 130, 140. In the normal mode of operation, the duty cycle is 70%. The available power for the lighting in the normal operation mode is therefore set at 596 W (70% of 850 W).

Figure 10:
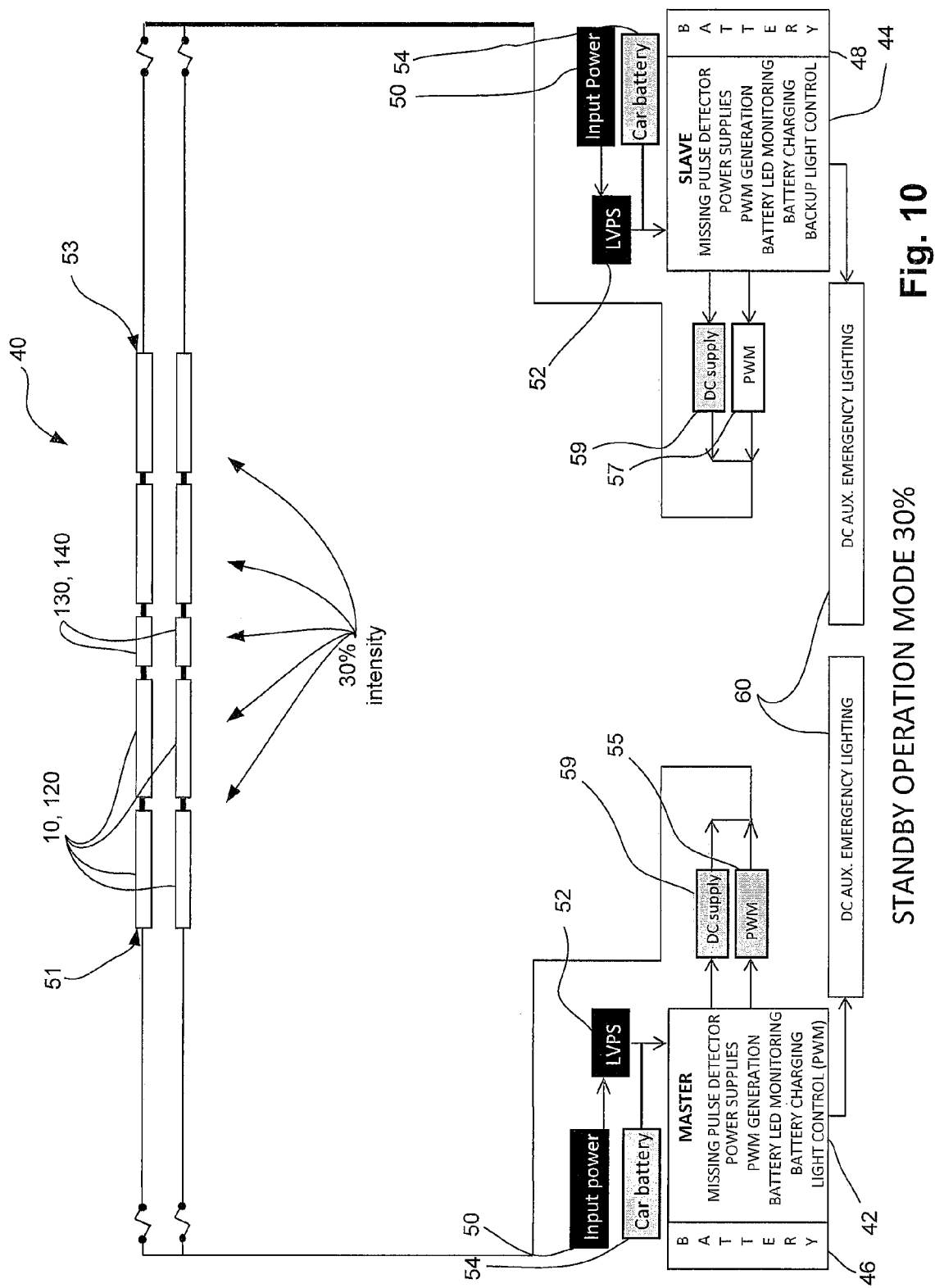
FIG. 10 is a schematic diagram showing a lighting system for a railway vehicle in accordance with another embodiment, where the lighting system is in a 30% standby operation mode.

According to another embodiment, and referring now to FIG. 10, there is shown a standby operation mode. The modules which are in operation are shown in grey and those which are inoperative are shown in black. The standby mode is normally in effect when the train is at the station or otherwise not moving (i.e., when the main power is "off"). In the standby operation mode, electrical power is provided to the lighting modules 10, 120 and auxiliary electrical modules 130, 140 by the rechargeable car battery 54 (aka external rechargeable battery) connected to both the master controller 42 and the slave controller 44. In the standby mode, as in the normal mode of operation, electrical power is provided to the lighting modules 10, 120 and auxiliary electrical modules 130, 140 at the first light row end 51 through the master controller 42 and to the lighting modules 10, 120 and auxiliary electrical modules 130, 140 at the second light row end 53 through the slave controller 44. The first modulation circuit (in the master controller 42) controls the duty cycle of the LEDs on the lighting modules 10, 120 and auxiliary electrical modules 130, 140. In the standby mode of operation, the duty cycle is 30%. The available power for the lighting in the standby operation mode is set at 256 W (30% of 850 W).

Figure 11:
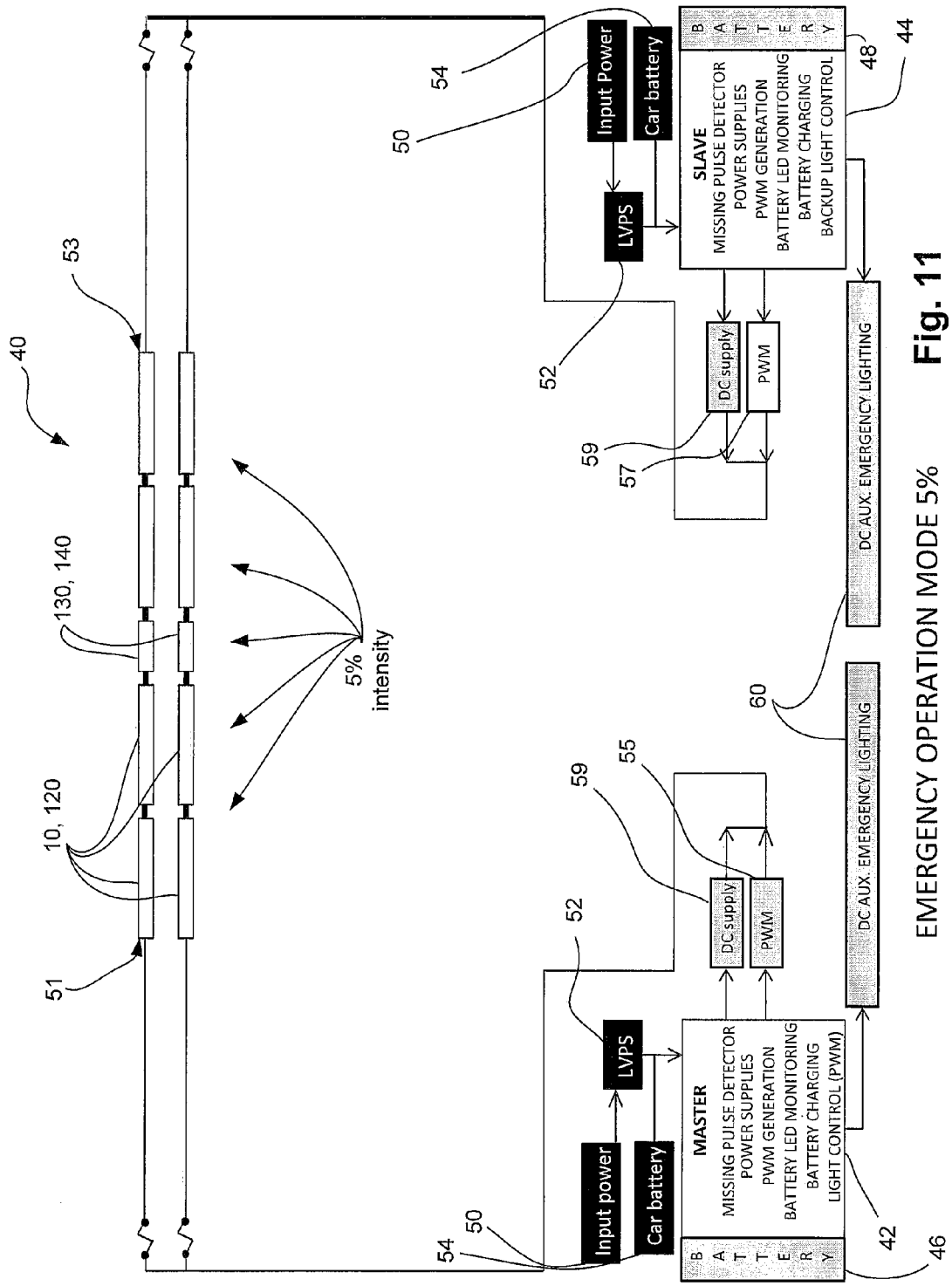
FIG. 11 is a schematic diagram showing a lighting system for a railway vehicle in accordance with another embodiment, where the lighting system is in a 5% emergency operation mode.

Referring now to FIG. 11, there is shown an emergency operation mode. The modules which are in operation are shown in grey and those which are inoperative are shown in black. The emergency mode is normally in effect after a certain period (e.g., 90 minutes) of standby operation mode or when the external power source 50, the vehicle power source 52, or the rechargeable car battery 54 are not in service. The first and second emergency batteries 46, 48 respectively provide electrical power to the lighting modules 10, 120 and auxiliary electrical modules 130, 140 at the first light row end 51 through the master controller 42 and to the lighting modules 10, 120 and auxiliary electrical modules 130, 140 at the second light row end 53 through the slave controller 44 in the emergency operation mode. The first modulation circuit 55 in the master controller 42 controls the duty cycle of the LEDs on the lighting modules 10, 120 and auxiliary electrical modules 130, 140. In the emergency mode of operation, the duty cycle is 5%. The available power for the lighting in the emergency operation mode is set at 43 W (5% of 850 W). In the emergency mode of operation, the first and second emergency batteries 46, 48 also provide electrical power to the auxiliary emergency lighting system 60 which provides lighting at the doors of the train.

Figure 12:
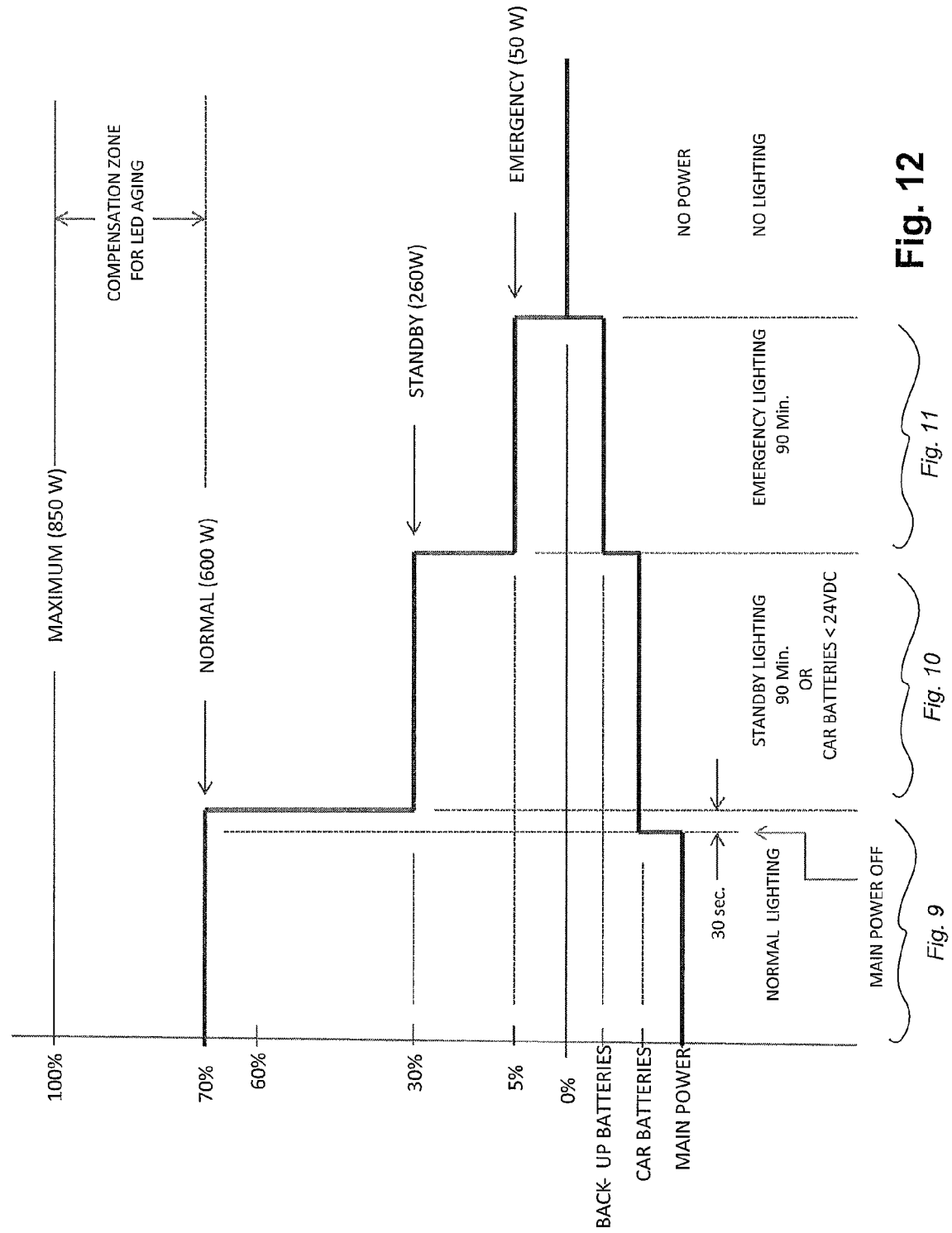
FIG. 12 is a graph which illustrates different operation modes of a lighting system for a railway vehicle in accordance with another embodiment.
Figure 13:
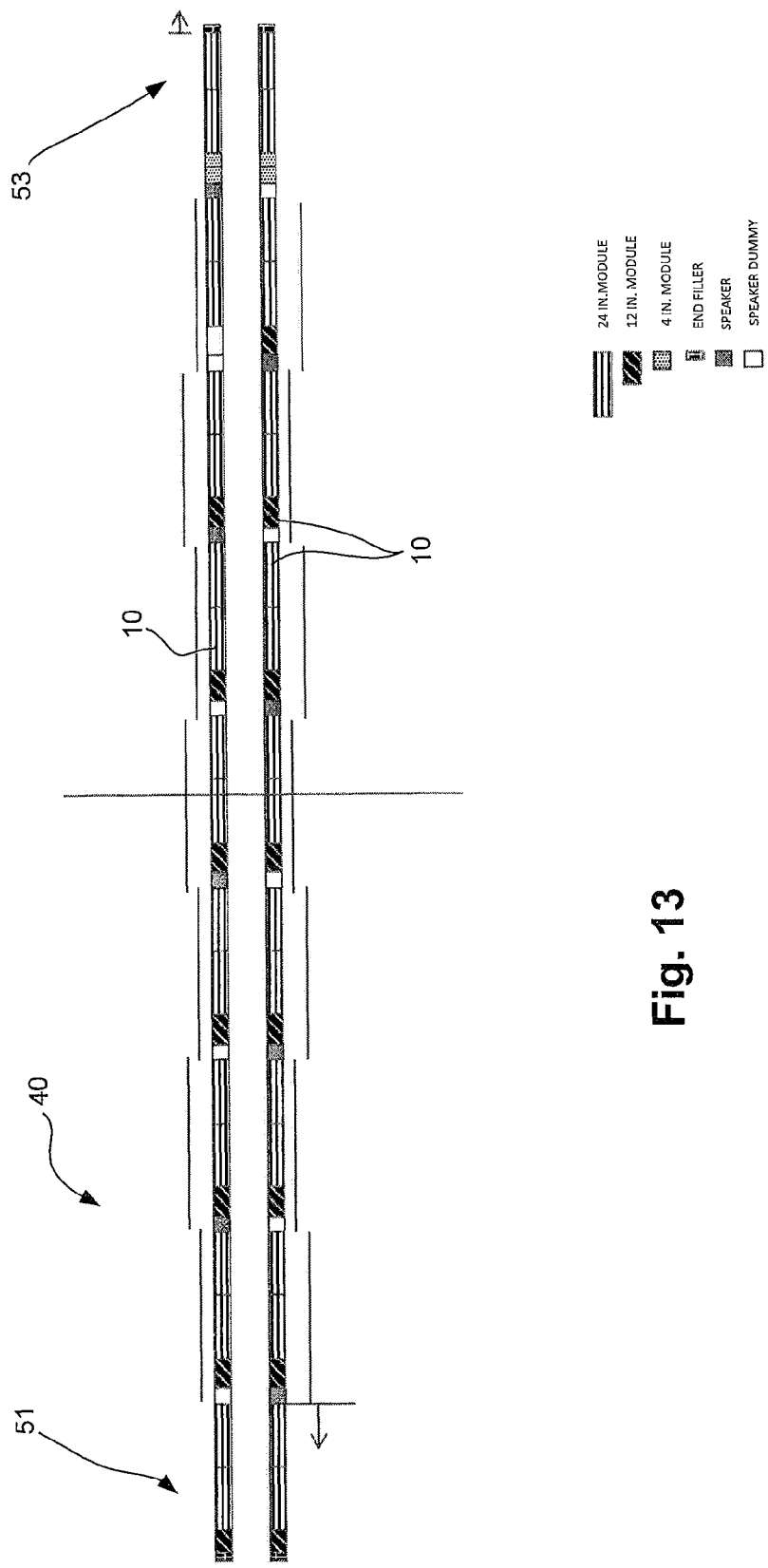
FIG. 13 is a schematic diagram which illustrates a lighting system for a railway vehicle in accordance with another embodiment, where the lighting system includes many lighting modules some being different from others.

As shown in FIG. 12, the lighting system is designed to be able to compensate for LED aging. Indeed, LEDs lose some of their intensity as they age. To do so, the system is designed to meet the required 100% of lighting intensity when the LEDs are powered to only 70% of their rated maximum power. Hence, in normal operation, the controllers adjust the intensity of the LEDs to 70% of their maximum capacity and in emergency mode to approximately 50% of the required lighting intensity, or in this case 30% of their rated maximum power.

Still referring to FIG. 12, there is shown a graph which illustrates the different operation modes of the lighting system for a railway vehicle as a function of time. FIG. 12 also shows which vertical section of the graph relates to FIGS. 8, 9 and 10 respectively. The top bold line (i.e., the "descending" stairs) show the duty cycle while the bottom bold line (i.e., the "ascending" stairs) show the corresponding source of power for each mode of operation. It is shown that power is provided to the lighting system by the "main power" (i.e., external power source and/or vehicle power source) while in the normal operation mode (70% of maximal power, to allow a compensation zone for the LED aging). The graph also shows that, in the standby operation mode (i.e., 30% duty cycle), power is provided to the lighting system 40 by the car battery 54. Finally, the graph shows that, in the emergency operation mode (i.e., 5% duty cycle), power is provided to the lighting system 40 by the first and second emergency batteries 46, 48). The time line shows that the normal operation mode will prevail until the main power is "off". After a 30 second period without the main power, the standby operation mode (30%) will go into effect for about 90 minutes, after which the emergency operation mode (5%) is active. After a certain period (e.g., another 90 minutes), there will be no power source in the railway vehicle and thus, no operative lighting system.

Figure 14:
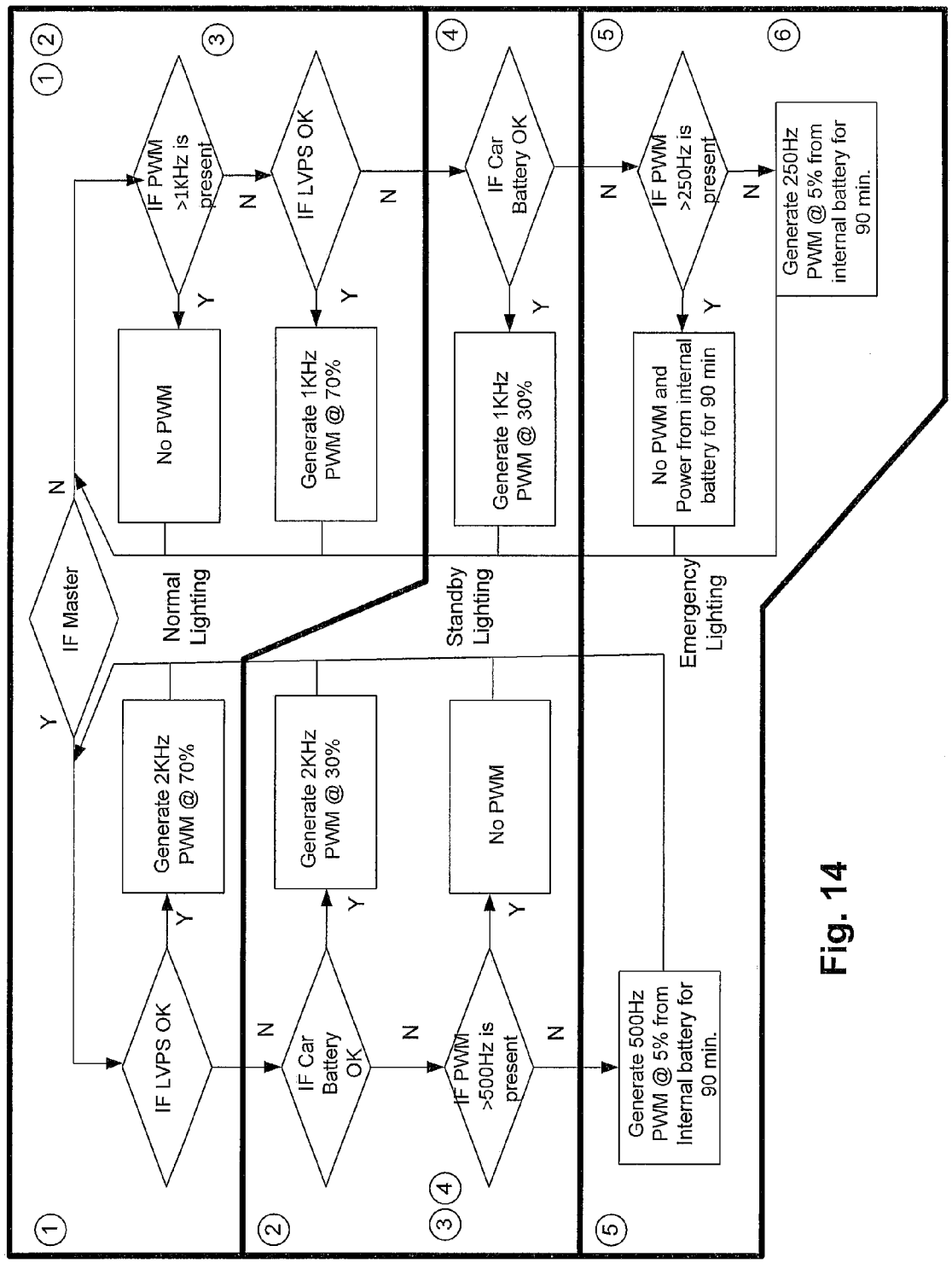
FIG. 14 is a bloc diagram illustrating the various modes of operation embodied by the method for controlling the intensity of LEDs on a lighting module according to an embodiment.

Now referring to FIG. 14 (and FIGS. 8 to 11 for the lighting system 40 components), there is explained an embodiment for the method for controlling the intensity of LEDs on a lighting module 10, 120 and the functioning of the master controller 42 and the slave controller 44 according to various modes of operation. According to this embodiment, both the master controller 42 and the slave controller 44 are operative to generate modulation signals and control signals. A modulation signal is a square wave whose width is proportional to the intensity of the LEDs and the modulation signal is superposed on a control signal that is sent by either the master controller 42 or the slave controller 44.

The determination as to which controller takes over and as to the intensity of the LEDs is determined as follows:

1—When the master controller 42 detects the presence of the vehicle power source 52, the master controller 42 sends, through a first Pulse Width Modulator 55 (PWM), a first control signal having a frequency of 2 kHz (for example) on which is superposed the first modulation signal which sets the intensity of the LEDs at 70% (aka the first LED intensity). This is one instance of the normal operation mode. The normal operation mode is effective as long as either the master controller 42 or the slave controller 44 receives power from the vehicle power source 52. The slave controller 44 is operative to detect the absence of first control signal for a given period (e.g., 1 millisecond) and not to send a control signal as long as it receives the first control signal from the master controller 42.

2—When the vehicle power source 52 is defective, the master controller 42 detects the presence of power available from the car battery 54. In this case as well, the master controller 42 sends, through the first Pulse Width Modulator 55 (PWM), a first control signal having a frequency of 2 kHz (for example). In this case however, a second modulation signal is produced and sets the intensity of the LEDs at 30% (aka the second LED intensity). This is one instance of the standby operation mode. This instance of the standby operation mode is effective as long as the master controller 42 receives power from the car battery 54 and the first control signal is present. The slave controller 44 is still operative to detect the absence the first control signal and not to send a control signal until it detects the absence of the first control signal.

3 & 4—If the master controller 42 loses power from both the vehicle power source 52 and the car battery 54, the slave controller 44 detects the absence of the first control signal and detects the presence of the vehicle power source 52, it sends, through the second PWM 57, a second control signal having a frequency below that of the first control signal. For example, the second control signal has a frequency of 1 kHz. Upon detecting the second control signal coming from the slave controller 44, the master controller 42 stops and understands that the slave controller 44 has taken over the control of the LEDs. The slave controller 44 performs functions normally performed by the master controller 42 and described in 1 and 2 above until the slave controller 44 detects the absence of the first control signal (2 kHz) and the master controller 42 detects the absence of the second control signal (e.g., 1 kHz).

5—When the master controller 42 detects the absence of second control signal (e.g., 1 kHz) and the vehicle power source 52 is still absent, the master controller 42 sends, through the first PWM 55, a third control signal (e.g., 500 Hz) whose frequency is lower than that of the second control signal (e.g., 1 kHz) and a third modulation signal is sent to the LEDs which produces an intensity lower than that produced by the first modulation signal and the second modulation signal. In this example, the third modulation signal sets the intensity of the LEDs at 5% (aka the third LED intensity). In this case, both the master controller 42 and the slave controller 44 send power to the LEDs using their respective emergency battery 46, 48.

6—When the slave controller 44 detects the absence of the third control signal (e.g., 500 Hz) and also detects the absence of the vehicle power source 52, it then sends, through the second PWM 57, a fourth control signal (e.g., 250 Hz) whose frequency is lower than that of the third control signal (e.g., 500 Hz) and powers all LEDs from its emergency battery 48 at 5% intensity using the third modulation signal.

Alternatively, each lighting module 10, 120 and optionally each auxiliary electrical module 130, 140 could use a small rechargeable battery 208 directly located on the PCB 12 of the lighting module 10, 120. These rechargeable batteries 208 are recharged by the power from the vehicle power source 52. In this embodiment, both the master controller 42 and the slave controller 44 could do without their respective emergency battery 46, 48 and the local rechargeable batteries 208 located on each lighting module 10, 120 are operative to power the LEDs 20 installed on their own lighting module 10, 120 when no power is received from either the master controller 42 or the slave controller 44. While preferred embodiments have been described above and illustrated in the accompanying drawings, it will be evident to those skilled in the art that modifications may be made without departing from this disclosure. Such modifications are considered as possible variants comprised in the scope of the disclosure.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A lighting system connected to a power source, the lighting system comprising:
    lighting modules connected end-to-end and forming a row having a first line end a second line end, each lighting modules comprising light emitting diodes (LEDS); and
    a master controller electrically connected to the first line end, the master controller adapted to being powered by the power source, the master controller being operative to control an intensity of the LEDs by sending a first modulation signal and a second modulation signal to the lighting modules, the first modulation signal corresponding to a first LED intensity and the second modulation signal corresponding to a second LED intensity;
    wherein the first modulation signal is sent when the master controller detects a presence of the power source and the second modulation signal is sent when the master controller detects an absence of the power source.

2. The lighting system of claim 1, further comprising a slave controller electrically connected to the second line end, the slave controller adapted to being powered by the power source.

3. The lighting system of claim 2, wherein the lighting system is further connected to an external rechargeable battery, further wherein the master controller is operative to send a first control signal and a third control signal to the slave controller and wherein the slave controller is operative to send a second control signal and a fourth control signal to the master controller, the master controller being operative to send the first control signal when the master controller detects a presence of power from the power source or from the external rechargeable battery and to send the third control signal when the master controller detects an absence of power from the power source, an absence of power from the external rechargeable battery and an absence of the second control signal, the slave controller being operative to send the second control signal when the slave controller detects an absence of the first control signal and to send the fourth control signal when the slave controller detects an absence of the first control signal, an absence of power from the power source, an absence of power from the external rechargeable battery and an absence of the third control signal.

4. The lighting system of claim 3, wherein the slave controller is operative to control the intensity of the LEDs by sending the first modulation signal and second modulation signal to the lighting modules; further wherein the first modulation signal is sent when the slave controller detects a presence of the power source and an absence of the first control signal and wherein the second modulation signal is sent when the slave controller detects an absence of the first control signal, an absence of the power source and a presence of the external rechargeable battery.

5. The lighting system of claim 4, wherein the master controller is operative to generate a third modulation signal corresponding to a third LED intensity upon detecting an absence of the power source, an absence of the external rechargeable battery and an absence of the second control signal, and the slave controller is operative to generate the third modulation signal upon detecting an absence of the first control signal, an absence of the power source, an absence of the external rechargeable battery and an absence of the third control signal.

6. The lighting system of claim 5, further comprising a first emergency battery connected to the LEDs and a second emergency battery connected to the LEDs, the first and second emergency batteries being operative to power the LEDs when one of the master controller and the slave controller sends the third modulation signal.

7. The lighting system of claim 6, wherein the first emergency battery is located on a first of the lighting modules and the second emergency battery is located on a second of the lighting modules.

8. The lighting system of claim 6, wherein the master controller further comprises the first emergency battery and wherein the slave controller comprises the second emergency battery.

9. The lighting system of claim 5, wherein the master controller comprises a first missing pulse detector operative to detect an absence of the second control signal and the fourth control signal and wherein the slave controller comprises a second missing pulse detector operative to detect an absence of the first control signal and the third control signal.

10. The lighting system of claim 5, wherein the master controller comprises a first modulation device to produce the first modulation signal, the second modulation signal, the third modulation signal, the first control signal and the third control signal, and wherein the slave controller comprises a second modulation device to produce the first modulation signal, the second modulation signal, the third modulation signal, the second control signal and the fourth control signal.

11. The lighting system of claim 5, wherein the third LED intensity is lower than the second LED intensity which is lower than the first LED intensity.

12. A method for controlling an intensity of light emitting diodes (LEDs) installed on a lighting module, the method comprising:
    sending a first modulation signal to the lighting module from a master controller upon detection of a presence of power from a power source by the master controller; and
    sending a second modulation signal to the lighting module from the master controller upon detection of an absence of power from a power source by the master controller;

wherein the first modulation signal corresponds to a first LED intensity and the second modulation signal corresponds to a second LED intensity lower than the first LED intensity.

13. The method of claim 12, further comprising sending by the master controller a first control signal to a slave controller upon detection by the master controller of a presence of power from a power source, a presence of the first control signal being indicative of control of the intensity of the LEDs by the master controller.

14. The method of claim 13, further comprising sending by the slave controller a second control signal to the master controller and the first modulation signal upon detection of an absence of the first control signal and of the presence of power from a power source by the slave controller, a presence of the second control signal being indicative of control of the intensity of the LEDs by the slave controller.

15. The method of claim 14, further comprising sending by the slave controller the second control signal to the master controller and the second modulation signal upon detection by the slave controller of an absence of the first control signal, an absence of power from a power source and a presence of power from an external rechargeable battery, a presence of the second control signal being indicative of control of the intensity of the LEDs by the slave controller.

16. The method of claim 15, further comprising sending by the master controller a third control signal to the slave controller and a third modulation signal upon detection of an absence of power from the power source, an absence of power from the external rechargeable battery and an absence of the second control signal, the third modulation signal corresponding to a third LED intensity and a presence of the third control signal being indicative of control of the intensity of the LEDs by the master controller.

17. The method of claim 16, further comprising sending by the slave controller a fourth control signal to the master controller and the third modulation signal upon detection of an absence of power from the power source, an absence of power from the external rechargeable battery and an absence of the third control signal, a presence of the fourth control signal being indicative of control of the intensity of the LEDs by the slave controller.

18. The method of claim 17, wherein the first, second, third, and fourth control signals each have a respective frequency, wherein the frequency of the first control signal is greater than the frequency of the second control signal which in turn is greater than the frequency of the third control signal which in turn is greater than the frequency of the fourth control signal.

19. The method claim 17, wherein the third LED intensity is lower than the second LED intensity which is lower than the first LED intensity.

* * * * *